United States Patent Office 2,771,602
Patented Nov. 20, 1956

2,771,602

ABSORPTION DEVICE FOR ELECTRO-MAGNETIC WAVES

Rudolf Kühnhold, Braunschweig, Germany, assignor to Electroacustic Gesellschaft mit beschrankter Haftung, Kiel, Germany, a corporation of Germany Application February 12, 1954, Serial No. 409,988

Claims priority, application Germany February 16, 1953

12 Claims. (Cl. 343—18)

The present invention relates to an absorption device for electro-magnetic waves.

One object of the invention is to provide a device by means of which electro-magnetic waves can be absorbed either completely or to a considerable extent in order to prevent the waves from being reflected by an object which is to be protected against detection.

Another object of the invention is to provide a device of this kind the factor of reflection of which can be conveniently adapted to all practical requirements.

The device of the invention is therefore particularly suited for the protection of military objectives against position-finding by means of radar.

One principal feature of the invention resides in the use of a plurality of grids arranged behind one another and consisting each of a plurality of parallel or intersecting threads, strips, bands, etc., hereinafter referred to as "grid elements." According to the invention these grid elements have an electrical conductivity which gradually rises from the grid-like rows first hit by the entering waves to succeeding elements, by means of which the wave energy is converted into heat and dissipated.

The invention will be best understood from a consideration of the following detailed description taken in connection with the accompanying drawings, forming a part of this specification, and in which an embodiment of the invention has been shown by way of illustration. However, I wish to say that the invention is not confined to any strict conformity with the showing of the drawings, but may be changed or modified, so long as such changes or modifications mark no material departure from the salient features of the invention as expressed in the appended claims.

In the drawings, in which like parts are referred to by the same reference numerals in all of the several figures, Fig. 1 is a perspective fractional view of a concealing device, preventing detection by absorption of electromagnetic waves;

Figure 1:
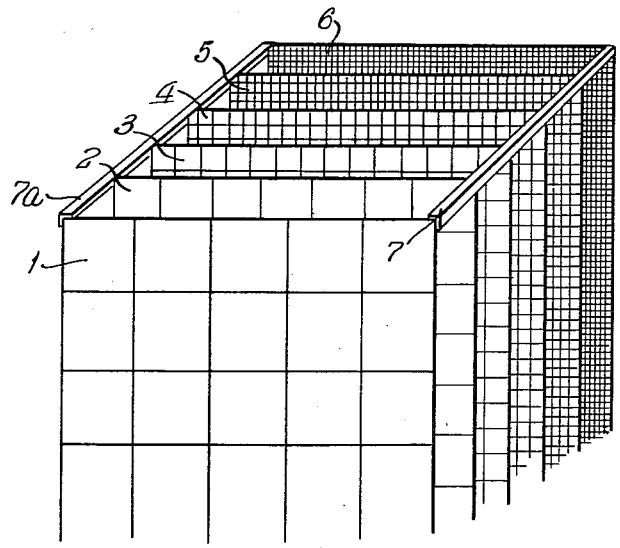
Figure 2:
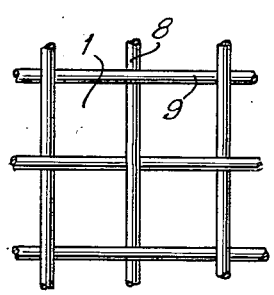
Fig. 2 is a fractional view of the front grid of the device of Fig. 1.
Figure 3:
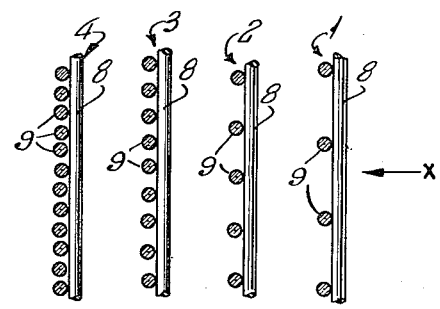
Fig. 3 is a vertical cross-section of a modified form of construction of the grids.

In the embodiment illustrated in Fig. 1, the concealing- or detection-preventing device consists of six grids 1, 2, 3, 4, 5 and 6. In this form of construction the grids consist of intersecting grid elements 8 and 9 (see Fig. 2) which have been rendered capable of conducting electromagnetic waves. The grid elements 8 and 9 may be united in net-like fashion in a common plane, as illustrated in Figs. 1 and 2. It is also possible to arrange the horizontally extending grid elements 9 in a separate plane behind the plane in which the vertical grid elements 8 extend, for instance, as shown in Fig. 3. The direction in which the waves advance toward the grid is indicated by the arrow $x$.

The individual grids may form units, of which each may be surrounded by a frame (not illustrated in the drawings), while the plurality of grids may be combined to form an entirety, supported in position by suitable supporting means, for instance angle bars 7, 7a.

Grid elements suited for the purpose of the invention may be produced from suitable insulating material, such as paper, hemp, artificial textile material or the like, in the form of threads, bands, or little bars, whereby the insulating material is given the required conductivity through the admixture of soot, graphite, carbon or the like.

If conductive paper bands are to be used as grid elements, they can be produced through admixture of conductive soots to paper-pulp which would normally be used for the production of paper. In a manufacturing process like this, the soot adheres to the fibre, whereby the individual fibre is rendered conducting on its surface. If the thickness of the paper is 0.10 mm., and if 5 to 50 units of soot are admixed with 100 units of wood pulp, sheet conductivities of from $10^3$ to $10^6$ mhos. per cm.$^3$ can be obtained in this way. It is also possible to produce a conductivity value of $10^5$ mhos. per cm.$^3$ by means of a mixture of soot and buna. In a similar way the aforesaid threads, bands, little bars or the like can be produced from other suitable insulating material. It is further feasible to cover the surface of suitable carriers, produced from insulating material, in an adsorptive manner with soots of suitable nature.

The desired absorption of electro-magnetic waves in a device of the kind herein described requires taking into consideration of the following design features:

In order to prevent the electro-magnetic waves which hit the front grid 1 of the group of grids from being reflected, care must be taken that the waves are enabled to penetrate either completely or almost completely into the interior of the device, and that absorption takes place in the depth of the device, which means that adaption of the device to the medium of propagation "air" is necessary.

If the influence of the dielectric constant is initially ignored, or if its value is assumed to be 1, it follows that, in order to fulfill the requirement of adaption, with the factor of reflection being given, the required value for the specific conductance $\delta$ of the front grid 1 has to be $$\delta = \frac{\text{the dielectric constant}}{\text{the wavelength in cm.}}$$

If the factor of reflection is assumed to be 10% (amplitude), the required value for the specific conductance $\delta$ of the front grid 1 is $$\delta = \frac{1}{0.008\lambda}$$

wherein $\lambda$ is the wavelength in centimeters of the longest wave to be absorbed.

The aforesaid assumption regarding the value of the dielectric constant is fulfilled by the device of the invention in an almost ideal manner, as the grid device of the invention is a structure which, because of the large portion of air included, is practically equal to air as far as its dielectric constant is concerned.

As, according to the invention, the conductivity of the grid elements is intended to be such that it enables an extensive absorption of the electro-magnetic waves, the invention proposes to gradually increase the average conductivity of the grids 2, 3, 4, 5 and 6 in such a way that thereby in the direction of the advancing wave a stepwise increasing conductivity is produced. In order to prevent an unduly high reflection occurring at the grids positioned near the end of the path of travel of the wave care must be taken that the increase of the average conductivity from grid to grid toward the rear end of the device is not too great. On the other hand, it is, of course, desirable to restrict the thickness of the device to what is absolutely necessary, and, consequently, to increase the average conductivity of the grids toward the rear end of the device to such an extent as appears permissible for the orderly inflow and absorption of the wave. Both of these requirements are best fulfilled by an exponential increase of the conductivity.

The required increase of the conductivity, as hereinbefore described, is obtained through increasing the average conductivity of the successively arranged individual grids. The average conductivity of the individual grid can be increased through reduction of the distances between the grid elements, and/or through the use of grid elements of higher electrical conductivity.

The distance between the grids, and also the distance between the grid elements, has to be in every case smaller than the shortest wave length for which the device is intended to be effective. If the distances are so selected that they are equal to one-third of the shortest wave length, then the device will practically not differ from a continuous device. Distances of less than one-third of the shortest wave length to be absorbed will produce practically no advantageous result.

The number of grids to be arranged behind one another should be in accord with prevailing conditions, and should be adapted to the requirements of the individual case. Details regarding the distance between the grids, taking into consideration the shortest wave length to be absorbed, were already given above. The entire depth of the arrangement depends, however, upon the maximal wave length to be absorbed, and upon the factor of reflection to be reached. For a permissible factor of reflection of about 10%, the thickness has to correspond to approximately one-third of the maximal wave length to be absorbed.

Measuring tests made at devices, as disclosed in the present invention, have taught that for a wave range of 10:1 the factor of reflection (amplitude) can easily be brought down to under 10%.

Because of the aforedescribed net-like structure of the cross-grids, consisting each of at least two rows of grid elements displaced with respect to each other through predetermined angles, the described device is able to absorb any kind of polarized electromagnetic wave. If the concealing of the objective is to be restricted to one single known plane of polarization of the entering waves, then simple line grids, consisting of parallel grid elements, can be used.

If, nevertheless, the reflections occurring on the front side or in the interior of the device should be considerable, they can be deflected in another direction through tilting of the device with respect to the entering direction of the waves.

The vacant spaces between the grid elements and/or the grids may be completely or partly filled up with a dielectric substance. However, a considerable modification of the conditions of adaption must be avoided. The limit for the effective dielectric constant, if the factor of reflection is supposed to be 10%, is at least 1.4. In this case the wave length, modified by the electric constants of the filling material, has to be used in the calculation of the distances between the grid elements or the grids, in the calculation of the entire depth of the concealing device, and in the calculation of the required conductivity of the front grid.

What I claim as new and desire to secure by Letters Patent of the United States:

1. An absorption device for electro-magnetic waves comprising a plurality of electrically-conductive grid structures, each grid structure comprising a first plurality of mutually parallel elongated grid elements crossed with a second plurality of mutually parallel elongated grid elements, said grid structures being arranged in spaced relation behind one another, the average conductance of the front one of said grid structures being equal to the dielectric constant of the material between said grid structures divided by the wavelength in centimeters of the longest electro-magnetic wave to be absorbed, each succeeding front to back grid structure of said plurality of grid structures being of greater average conductance than its preceding grid structure.

2. An absorption device for electro-magnetic waves comprising a plurality of electrically-conductive grid structures, each grid structure comprising a first plurality of mutually parallel elongated grid elements crossed with a second plurality of mutually parallel elongated grid elements, said grid structures being arranged in spaced relation behind one another, the average conductance of the front one of said grid structures being equal to the dielectric constant of the material between said grid structures divided by the wavelength in centimeters of the longest electro-magnetic wave to be absorbed, each succeeding front to back grid structure of said plurality of grid structures being of increasing average conductance relative its preceding grid structure, the spacing between successive grid structures and the spacing between mutually parallel ones of said first and second plurality of grid elements of said grid structures each being substantially equal to one-third of the wavelength of the shortest electro-magnetic wave to be absorbed.

3. An absorption device as specified in claim 1 wherein the average conductance of said grid structures increases exponentially and wherein the front to back thickness of said plurality of grid structures is substantially equal to the maximal wavelength to be absorbed, whereby a factor of reflection of about 10% is achieved.

4. An absorption device as specified in claim 1 wherein said first and second pluralities of grid elements of each grid structure are interwoven.

5. An absorption device as specified in claim 1 wherein said first and second pluralities of grid elements lie in separate planes directly behind each other.

6. An absorption device as specified in claim 1 wherein the spacing between mutually parallel ones of said first and second plurality of grid elements of said grid structures is less than the length of the shortest electromagnetic wave to be absorbed.

7. An absorption device as specified in claim 1 wherein the spacing between successive grid structures is less than the length of the shortest electromagnetic wave to be absorbed.

8. An absorption device as specified in claim 1 wherein the spacing between successive grid structures is substantially equal to the length of the shortest electromagnetic wave to be absorbed.

9. An absorption device as specified in claim 1 wherein the average conductance of said grid structures increases exponentially.

10. An absorption device as specified in claim 1 wherein the respective grid elements of succeeding front to back grid structures are of increasing conductivity.

11. An absorption device as specified in claim 1 wherein the respective pluralities of grid elements of successive front to back grid structures increase in number and wherein all of the grid elements are of substantially equal conductance.

12. An absorption device as specified in claim 1 wherein said grid elements are comprised of insulating material admixed with carbon particles, whereby they are rendered conductive.

References Cited in the file of this patent

Ridenour: Radar System Engineering, vol. 1, Radiation Laboratory Series, McGraw-Hill Book Co., New York, 1947, page 72.